Patented May 27, 1941

2,243,094

UNITED STATES PATENT OFFICE 2,243,094

REFRACTORY DENTAL MOLD FOR CASTING ALLOYS

Cornell Joel Grossman, Millburn, N. J.

No Drawing. Application December 12, 1939, Serial No. 308,829

1 Claim. (Cl. 22—188)

The object of my invention is the production of a mold into which dental metals or dental metallic alloys can be cast with a clean nonoxidized accurate surface, in intricate designs.

My mold composition consists of a mixture of zircon and zirconia and entails the use of zirconium oxychloride as the binding medium. Two mixtures and methods are given below:

Zircon mixture (by weight) for medium set (30 minutes)

| | Parts |
|---|---|
| Refined zircon granular | 100 |
| Refined zircon milled | 50 |
| Calcined magnesium oxide | 1.5 |
| Zirconium oxychloride solution 1.38 sp. gr. | 14 |

Zircon mixture (by weight) for fast set (1.5 minutes)

| | Parts |
|---|---|
| Refined zircon granular | 100 |
| Refined zircon milled | 50 |
| Calcined magnesium oxide | 3 |
| Zirconium oxychloride solution 1.38 sp. gr. | 20 |

On the above two methods, after mold is made care should be taken not to allow shape to dry off at any point until set, strip pattern and dry uniformly either at 100° or 150° C. Magnesium oxide content of 5% causes immediate setting; magnesium oxide content of 4% in conjunction with 13% of zirconium oxy-chloride; 20% of fine silica and the balance a bond silica or a 20 mesh silica mixed in the proportion of 5 ounces of the above mixture to 10 cc. of water produces a plastic mass which can be vibrated to form a dental mold in a most ideal manner. The setting time permitting 10 minutes in which to mix and form the mold with an immediate set thereafter.

The zirconium oxychloride method for zirconia mixture (by weight) is:

| | |
|---|---|
| Electrically fused zirconium oxide parts | 100 |
| Calcined magnesia percent | 1 |
| Zirconium oxychloride solution do 1.38 specific gravity. | 9-10 |

This mixture should be fired at 2860° F. for strong bond. Two older but excellent methods and mixtures of binding crude and refined zircon for refractory purposes which make the binder additions less costly are given below. I also give an auxiliary binder for use with zircon which has given good results. The mixture in these cases are given by weight.

Mixture (1)

| | Per cent |
|---|---|
| Crude zircon sand | 68 |
| Crude milled zircon | 14 |
| Powdered ball clay | 12 |
| Portland cement | 6 |
| Water | About 8 |

Without departure from the scope of this invention any compound zirconium silicate can be substituted for zircon. Examples of such substitutes are zircon air set cement, zirconite, zircite cement, zircon bonded magnesite, zirconium magnesium silicate, zirconium zinc silicate, zirconium hydroxide and so forth. Thus dental molds in this invention can be made of zirconium magnesium silicate, zirconium oxy chloride, a refractory aggregate, with or without the addition of magnesium oxide. Zirconium magnesium silicate content is best limited to less than 33%.

Magnesium chloride may also be substituted in the bonding agent in this invention.

Within the scope of the invention clay, calcium aluminate cement, Portland cement, accelerated Portland cement, hydraulic cements including gypsum types can be substituted for the bonding agent.

Magnesium oxide can be increased for quicker setting and ratios of ingredient varied without departure from the scope of this invention.

Acids can be substituted in the bonding agent, for example hydrochloric or nitric acid, the end result being the same and within the scope of this invention.

Other refractory aggregate can be added in this invention to lessen shrinkage or cost of properties, for example chromite.

The features of novelty of the invention are:
1. Higher refractoriness
2. The use of zirconium compound
3. The use of a metallic silicate in a dental investment.

In separate patent applications I will describe the use of other metallic silicates for dental investments.

This new mold material will when slowly dried out withstand preheating as high as 1700° Fahrenheit, and the metal can be cast into the mold at a temperature preferably between 1200° Fahrenheit and 1700° Fahrenheit for high fusing alloy castings.

Having thus described my invention what I claim is:

A casting mold and mold material for metallic dentures, and the like, comprising zirconium oxy chloride solution 8 to 15%, magnesium oxide .9 to 2%, balance zircon and zirconia.

CORNELL JOEL GROSSMAN.